United States Patent [19]

Oden

[11] 4,019,650
[45] Apr. 26, 1977

[54] TANDEM COLUMN VENDER APPARATUS

[75] Inventor: Kenneth W. Oden, Charles Town, W. Va.

[73] Assignee: Dixie-Narco, Inc., Ranson, W. Va.

[22] Filed: Oct. 29, 1975

[21] Appl. No.: 626,643

[52] U.S. Cl. .................................. 221/116; 221/67
[51] Int. Cl.² ........................................ B65G 59/00
[58] Field of Search ................. 221/67, 89, 90, 94, 221/95, 112, 115–118, 123, 133, 299, 301, 125, 129

[56] References Cited

UNITED STATES PATENTS

| | | | |
|---|---|---|---|
| 2,951,616 | 9/1960 | Johsnon | 221/67 |
| 2,988,246 | 6/1961 | Johnson et al. | 221/116 |
| 3,026,002 | 3/1962 | Torres | 221/67 |
| 3,158,247 | 11/1964 | Gale | 221/116 |

Primary Examiner—Robert B. Reeves
Assistant Examiner—H. Grant Skaggs

Attorney, Agent, or Firm—Bacon & Thomas

[57] ABSTRACT

A vending machine having a compartment dimensioned to hold two pairs of columns of cylindrical articles with the columns of each pair arranged with their articles in axial alignment, front to rear, and the two pairs being vertically staggered and horizontally overlapping. A bail structure comprises upper and lower bail bars swingable about a central fore and aft axis, to opposite sides thereof. The lower bail bar, when in one lateral position, supports the bottom articles of one pair of columns while the upper bail bar supports all other articles in the compartment. The lower bail bar is laterally wider under the rear columns than under the front columns so that partial swinging of the bial releases the bottom article from only the front column and further swinging releases the bottom article of the rear column.

2 Claims, 6 Drawing Figures

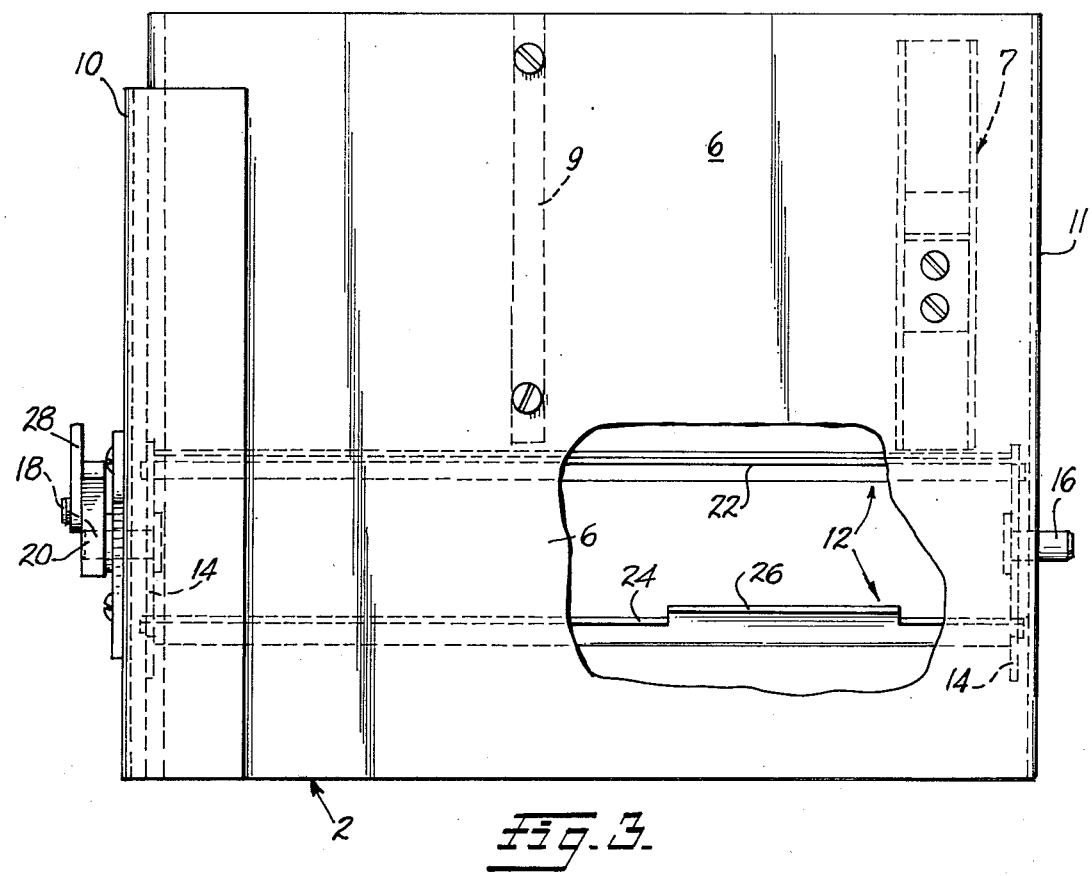
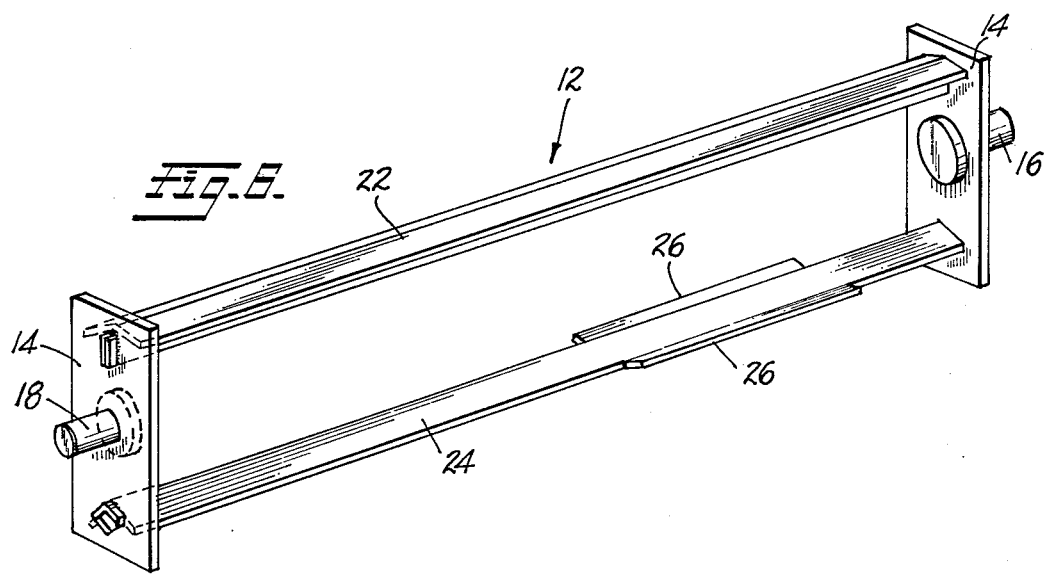

TANDEM COLUMN VENDER APPARATUS

BACKGROUND OF THE INVENTION

This invention is in the field of dispensing machines for bottles and/or cans.

It has been known heretofore to construct vending machines for vending either bottles or cans wherein a compartment was dimensioned to hold two side-by-side pairs of columns of articles in vertically staggered and laterally overlapping relation and with one of the columns of each pair of columns rearwardly of the other and with swinging bail means to selectively release a single can at a time. Such a device is shown and described in the patent to Ural, U.S. Pat. No. 3,463,355. In that patent, the side walls of the compartment were provided with cut-out portions opposite one of the front or rear columns so that initial swinging of the supporting bail would release an article from one of the columns during initial movement of the bail and further movement thereafter would release an article from the other front or rear column. Such devices, however, involved the modification of the compartment walls. That patent also employs two separate swinging bails, one for each of the side pairs of columns in the apparatus.

SUMMARY OF THE INVENTION

The present invention involves a single bail structure having dual bail elements thereon constructed to release only a single can or bottle at a time without modification of planar compartment side walls.

It is, therefore, an object of this invention to provide a vender apparatus capable of sequentially vending single articles from four columns thereof in a single compartment and involving only a single swinging bail structure.

A further object is to provide such a device of simple construction and economical to manufacture.

BRIEF DESCRIPTION OF THE DRAWINGS

FIG. 3 is an elevational view, as seen from the right of FIG. 1, with parts broken away to show internal structure;

FIG. 6 is a perspective view of the swinging bail structure.

DESCRIPTION OF A PREFERRED EMBODIMENT

Figure 1:
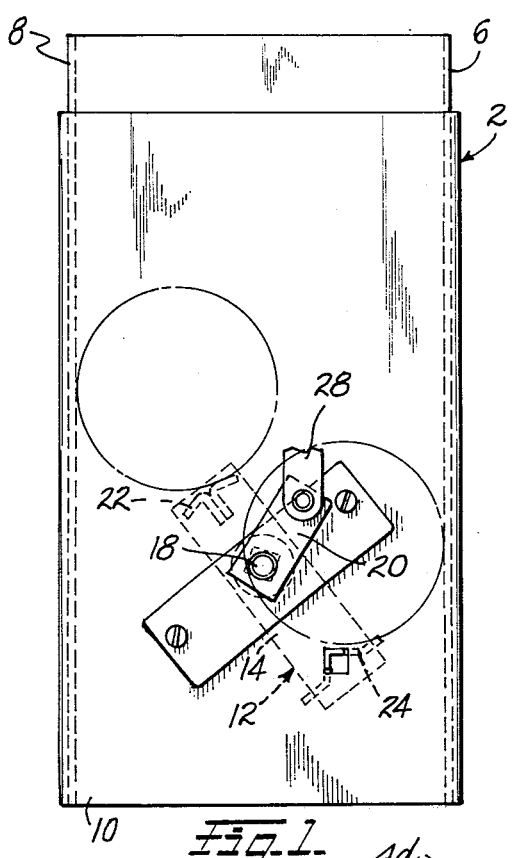
FIG. 1 is a front view of the compartment portion of a vender embodying the present invention with certain parts being broken away.

In the drawings, numeral 2 designates generally means defining a rectangular compartment adapted to contain and restrain a plurality of columns of generally cylindrical articles in columns 4a to 4d. As shown in the drawings, the articles are arranged in four columns, a front column of articles 4a on the left side of the compartment as seen in the figures, a rear column of articles 4b on the left side of the compartment, a front column of articles 4c on the right hand side of the compartment and a rear column 4d of such articles on the right hand side of the compartment. As is apparent, the right and left hand columns of each pair are vertically staggered and laterally overlapping so that support of the bottom article in either pair of columns will effect support of both pairs of columns, all as is well known in the art.

The compartment 2 comprises side walls 6 and 8 of planar configuration throughout their vertical extent. The rear of the compartment is defined by an adjustable wall structure 7 which can be adjusted in a fore and aft direction to accommodate articles of different size. Spacers 9 are mounted on the side walls to separate the front and rear columns of each pair. A rear wall 11 constitutes a frame member for the side walls 6 and 8, the other ends of which are fixed to and supported by a front wall member 10.

Figure 4:
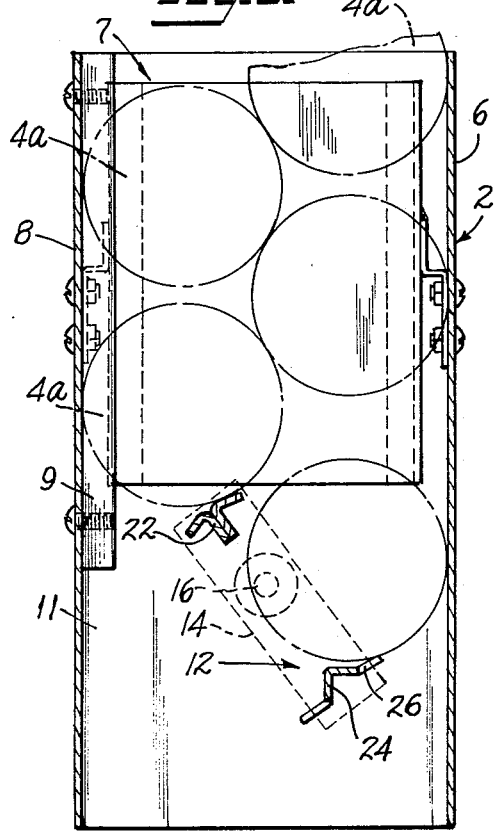
FIG. 4 is a transverse sectional view taken on the line 4—4 of FIG. 2.
Figure 2:
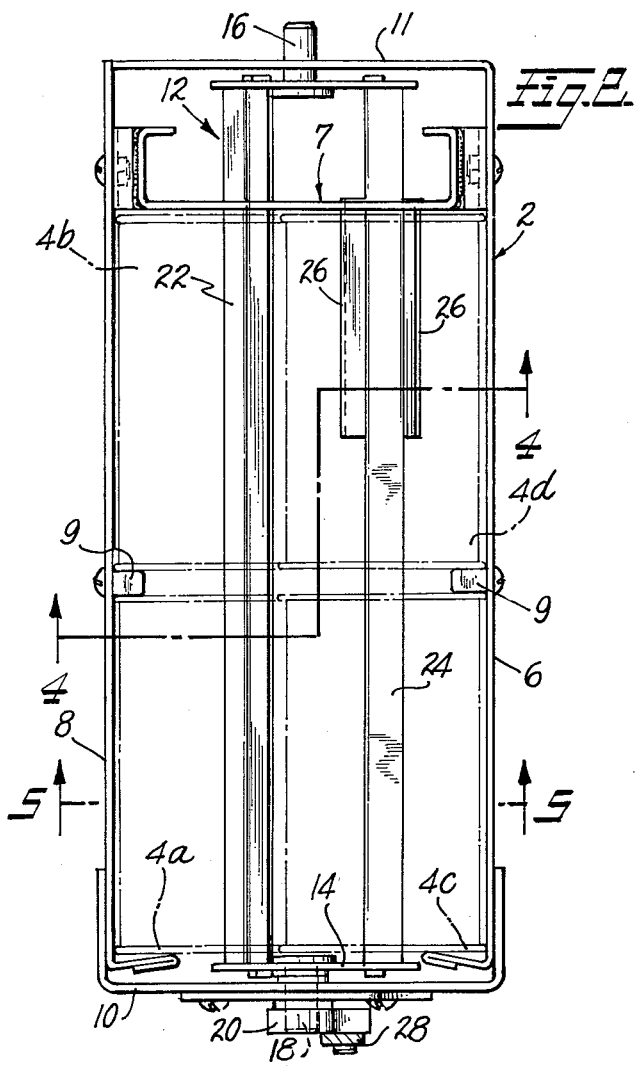
FIG. 2 is a top plan view of the apparatus shown in FIG. 1.
Figure 5:
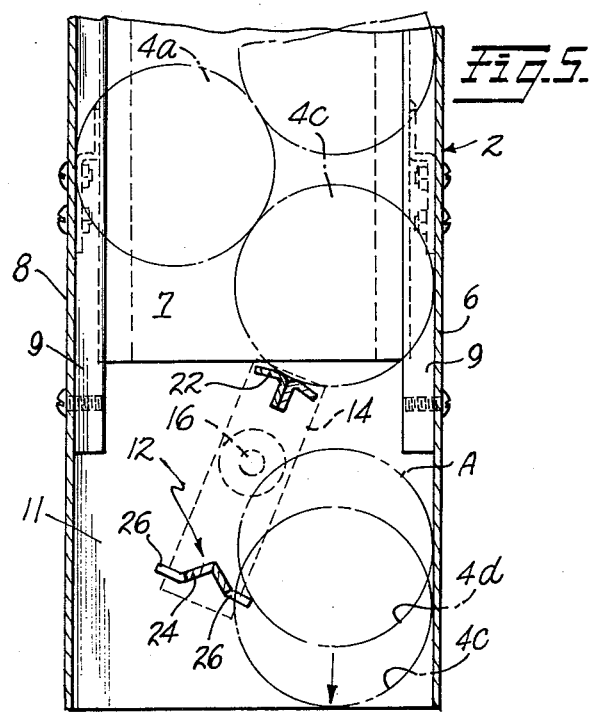
FIG. 5 is a fragmentary transverse sectional view taken on the line 5—5 of FIG. 2, with the swinging bail shown in a different position from that shown in FIG. 4.

A dual swinging bail structure designated 12 and best shown in FIG. 6 is provided with end plates 14 to which are secured axially aligned trunions or stub shafts 16 and 18. The rear stub shaft 16 is journalled in the rear wall 11 of the apparatus and the front stub shaft 18 extends through and is journalled in the front wall 10. The outer end of the stub shaft 18 is provided with a crank arm 20 (see FIG. 1) fixed thereto. Extending between and fixed to the upper and lower ends respectively of the end plates 14 are bail members 22 and 24. The upper bail member 22 may be configured as shown in FIGS. 4 and 5 to define laterally extending flanges arranged to define a substantially circular arc, at their upper surfaces, approximately concentric to the axis of the shafts 16 and 18. The lower bail 24 extending between the lower ends of the end plates 14 comprises a major portion of substantially inverted V shape as clearly seen in FIGS. 4 and 5. Both the upper and lower bails 22 and 24 are preferably formed of sheet metal. A portion of the lower bail 24 below the rear columns 4b and 4d is provided with laterally extending flanges 26, extending laterally a greater distance than the edges of the inverted V shaped bail portions under the front columns 4a and 4c.

The crank arm 20 previously referred to may be connected to a suitable connecting rod 28 (see FIG. 1) which in turn may be connected to any suitable driving motor effective to oscillate the bail structure about the axis of the aligned shafts 16 and 18. It is contemplated that a drive motor will rotate a crank pin to effect oscillation of the crank arm 20 through connecting rod 28 and that control means for the motor will effect operation thereof to swing the bail only part way through one oscillation and then stop. Thereafter, deposit of a further coin, for example, will cause the motor to further oscillate the bail in the same direction to a terminal position as will be more fully described later. Such control means for the motor may be a cam mechanism of the type fully shown and described in the patent to Ural U.S. Pat. No. 3,463,355.

Assuming the parts to be in the position shown in FIG. 4 wherein the bail structure 12 is in the position shown in that figure, the upper bail 22 will support the lowermost cans of the front and rear columns 4a and 4b and thus support all cans of all four columns except those at the bottom of columns 4c and 4d. The two bottom articles 4c and 4d rest on the lower bail 24, as shown in FIGS. 1 and 4. When a coin is deposited in suitable control mechanism, the motor referred to is actuated to swing the bail structure about its horizontal axis to the position shown in FIG. 5 wherein the upper bail 22 has moved to a position to support articles in the right hand column and the lower bail has been moved laterally away from the right hand side wall 6 a sufficient distance for the lowermost article in the front column 4c to drop past the forward portion of the bail 24 to a dispensing station. In this position, however, the flange 26 under the rear column 4d retains the lowermost article of the column 4d, as shown in dotted line at A in FIG. 5. The cam switching mechanism previously referred to will stop the driving motor at this point and only one can will have been dispensed. It is to be understood that when the bail 12 swings from the position of FIG. 4 to the position of FIG. 5, the lowermost articles of the left hand columns 4a and 4b will drop onto and be retained by the lower bail 24, though not shown in FIG. 5.

After the lowermost article of the front right hand column has been discharged, as described with reference to FIG. 5, a further coin may be deposited in the machine to actuate the driving motor to swing the bail structure further clockwise from the position of FIG. 5 to such position that the article shown at A in that figure can drop past the supporting flange 26, between that flange and the adjacent side wall 6 of the compartment while the upper bail 22 still holds all articles of all columns in the upper position shown and with the two bottom articles of the left hand columns resting on the lower bail 24. Upon deposit of further coins, the bail 12 is caused to swing counterclockwise in steps as already described and the described dispensing operations are repeated on the other side of the compartment.

The upper surface of the upper bail 22, being generally cylindrical about the axis of 16–18, results in being able to swing the bail structure without having to lift or raise the columns supported by the upper bail.

Thus, applicant has provided an extremely simple and inexpensive apparatus capable of dispensing single articles from a compartment containing four columns thereof and dispensing those articles in selected sequence.

Obviously, the invention is adaptable to an apparatus wherein the lower bail controls only a single pair of front-rear columns.

While a single specific embodiment of the invention has been shown and described, the same is merely illustrative of the principles involved and other modifications may be employed within the scope of the appended claims.

I claim:

1. In a vending apparatus having opposed longitudinal side walls, a rear wall and a front wall defining a compartment for containing and confining at least two columns of generally cylindrical articles with articles of one column axially displaced from the articles of the other column in a front to rear direction, and a longitudinally extending bail extending below both columns in supporting relation to at least the bottom articles thereof and being mounted for lateral movement from a first position supporting said articles to a terminal position wherein all portions thereof are sufficiently spaced from one side wall to permit downward passage of said articles therebetween, the improvement comprising:

said bail comprising an inverted V-shaped, one piece, elongated member having a laterally extending longitudinal flange defining a portion of the edge thereof nearest said one side wall, said one side wall being planar;

said flange below only one of said columns extending farther toward said one side wall than the remainder of the member whereby said bail may be moved laterally away from said one side wall to permit the bottom article of the other of said columns to drop therepast while said flange supports the bottom article of said one column and further lateral movement of said bail to said terminal position then permits said bottom article of said one column to drop therepast;

said bail being pivotally mounted for arcuate swinging movement about a fore-and-aft axis, and means in rigidly fixed relation thereto and swingable therewith and arranged to swing into supporting engagement with those articles of said columns above said bottom articles in response to swinging movement of said bail away from said first position.

2. Apparatus as defined in claim 1 wherein said flanged bail is mounted to swing below said axis and wherein said last-named means comprises an upper bail, having laterally extending flanges configured to define a substantially cylindrical upper surface concentric to said axis and swingable above said axis.

* * * * *